United States Patent [19]

Roberts

[11] Patent Number: 4,604,067
[45] Date of Patent: Aug. 5, 1986

[54] METHOD AND APPARATUS FOR CONVERTING LINE TRIMMER INTO A TROLLING MOTOR

[76] Inventor: Jimmy C. Roberts, P.O. Box 285, Sumterville, Fla. 33585

[21] Appl. No.: 673,773

[22] Filed: Nov. 20, 1984

[51] Int. Cl.$^4$ .............................................. B63H 21/26
[52] U.S. Cl. ..................................... 440/49; 440/113; 440/900; 30/122
[58] Field of Search ..................... 440/49, 113, 900, 6; 30/347, 276, 122; 416/146 R, 146 B

[56] References Cited

U.S. PATENT DOCUMENTS

| | | | |
|---|---|---|---|
| 860,251 | 7/1907 | Schmoele | 440/900 |
| 1,875,451 | 9/1932 | Harris | 440/900 |
| 4,076,193 | 2/1978 | Weaver | 440/900 |
| 4,179,805 | 12/1979 | Yamada | 30/122 |
| 4,188,719 | 2/1980 | Hoff | 30/122 |
| 4,286,675 | 9/1981 | Tuggle | 30/276 |

Primary Examiner—Trygve M. Blix
Assistant Examiner—Thomas J. Brahan
Attorney, Agent, or Firm—Harvey B. Jacobson

[57] ABSTRACT

A method and apparatus is provided for converting a gasoline motor powered line trimmer into an outboard trolling motor. The method includes the removal of the trimmer line spool head from the lower end of the trimmer and the replacement of the head with a marine propeller, the removal of the usual handle from the upper end portion of the housing of the trimmer and the replacement of that handle with a conventional trolling motor transom mount and the addition of a clamp mounting steering arm to the upper end portion of the housing of the trimmer and the relocation of the throttle control assembly of the trimmer from the upper end portion of the trimmer housing to the free end of the steering arm.

6 Claims, 6 Drawing Figures

METHOD AND APPARATUS FOR CONVERTING LINE TRIMMER INTO A TROLLING MOTOR

BACKGROUND OF THE INVENTION

1. Field of the Invention

This invention relates to motorized harvesters of the type including rotating cutting elements and to the marine propulsion field including outboard motors. The motorized harvester is of the line trimmer type and the invention resides in the method of converting the line trimmer into a marine propulsion unit of the outboard type equipped with a screw-type marine propeller.

2. Description of Related Art

Various different forms of motorized line trimmers heretofore have been provided as well as various forms of outboard motors. Further, various devices have been provided for converting gasoline-powered outboard motors to electric trolling motors, for converting a change saw into a lawn trimmer and for converting chain saws into various different forms of power tools. However, the method and apparatus of the instant invention enable a line trimmer to be readily converted into a trolling motor and back to a line triamer with little effort.

Examples of various different forms of conversion structures as well as other structures including some of the general structural and operational features of the instant invention are disclosed in U.S. Pat. Nos. 1,953,599, 3,763,819, 4,076,193, 4,188,719 and 4,311,470.

SUMMARY OF THE INVENTION

The conversion apparatus of the instant invention includes a conventional gasoline powered lawn trimmer of the type including an elongated tubular housing having relatively angulated opposite end portions joined by a smoothly curved intermediate length portion. An elongated flexible drive shaft extends through and is journalled from the housing and a drive motor is mounted on one end portion of the housing and includes a rotary output shaft drivingly coupled to the drive shaft through the utilization of a centrifugal clutch. A trimmer line spool head is removably mounted on the other end of the drive shaft remote from the motor merely by a threaded connection. The method conversion of the instant invention includes removal of the trimmer line spool head from the end of the drive shaft remote from the motor, the mounting of a marine-type propeller on the drive shaft end in lieu of the trimmer line spool head and the mounting of a conventional transom mounting bracket of an electric trolling motor on the end portion of the tubular housing from which the drive motor is mounted.

The main object of this invention is to provide an apparatus and method for converting a line trimmer into an outboard trolling motor.

Another object of this invention is to provide a method and apparatus in accordance with the preceding object which may be practiced and utilized to effect the desired conversion with little effort.

Still another important object to this invention is to provide a method and apparatus by which the owner or purchaser of a motor driven line trimmer may readily and inexpensively convert the line trimmer into a trolling motor.

A final object of this invention to be specifically enumerated herein is to provide conversion structure for converting a line trimmer into an outboard trolling motor and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 3:
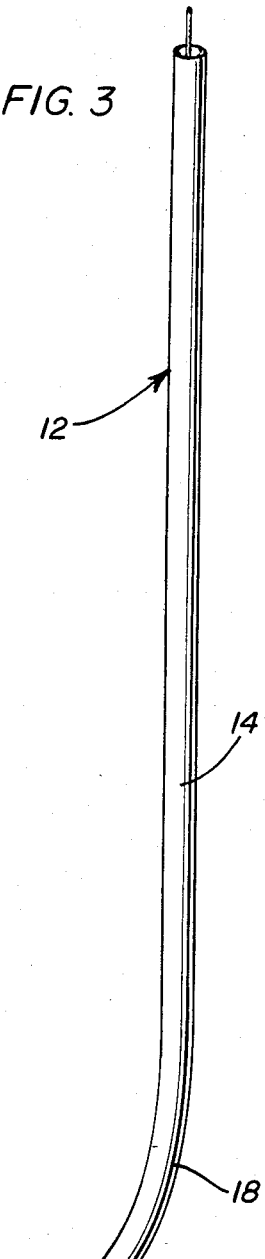
FIG. 3 is a perspective view of the tubular housing of the line trimmer with the line trimmer spool head mounted thereon.
Figure 4:
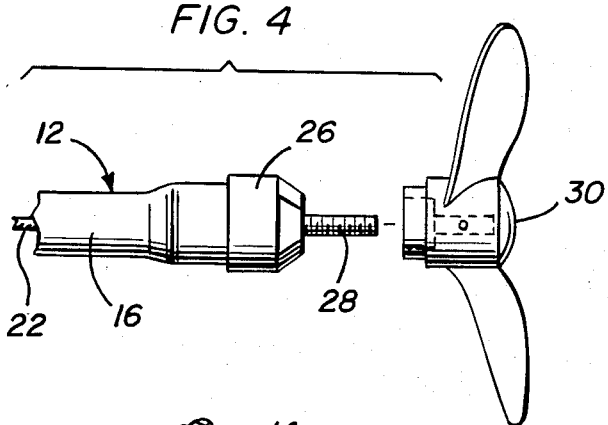
FIG. 4 is a fragmentary exploded elevational view illustrating the manner in which a marine propeller may be mounted on the output end of the flexible drive shaft after the line tremor spool head has been removed.
Figure 6:
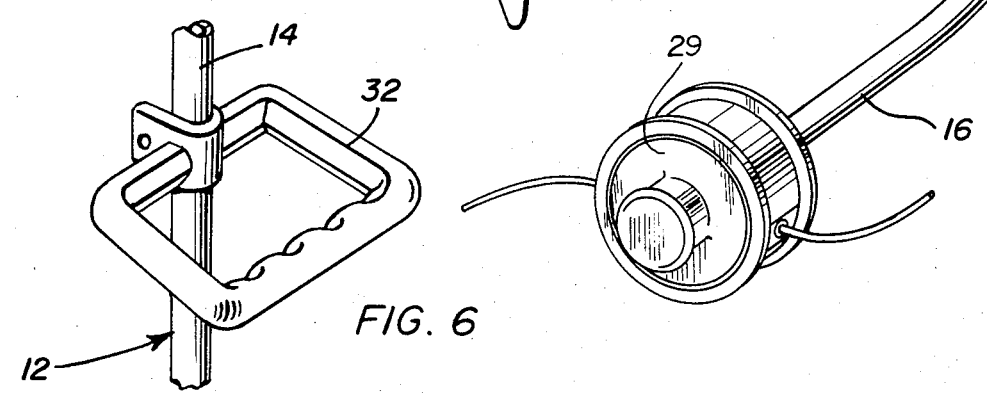
FIG. 6 is a fragmentary perspective view of the upper end portion of the tubular housing of the line trimmer illustrating the handle of the line trimmer which is removed preparatory to converting the line trimmer to an outboard trolling motor.

Referring now more specifically to the drawings, the numeral 10 generally designates a conventional form of gasoline engine powered line trimmer which has been converted into a trolling motor. The converted apparatus 10 includes an elongated tubular housing referred to in general by the reference numeral 12 having relatively angulated opposite end portions 14 and 16 joined by a smoothly curved intermediate length portion 18. A drive motor referred to in general by the reference numeral 20 is mounted on the end of the end portion 14 remote from the end portion 16 and includes a rotary output shaft (not shown). The housing 12 journals a flexible drive shaft 22 therethrough and the rotary output shaft of the motor 20 is drivingly coupled to the drive shaft 22 by a centrifugal clutch 24. The end of the drive shaft 22 remote from the motor 20 has a cup-shaped collar 26 thereon in which the adjacent end of the housing 12 is closely received and the fitting 26 includes an endwise outwardly projecting threaded mounting shank portion 28 upon which a trimmer line spool head 29 is removably threadedly mounted, see FIG. 3.

In order to effect the conversion of the line trimmer to an outboard trolling motor, the head 29 is unthreaded from the shank portion 28 and a trolling motor propeller 30 is threaded onto the mounting shank portion 28 in lieu of the trimmer line spool head 29. In addition, the usual trimmer handle 32 is removed from the upper end portion 14 of the housing 12 and replaced by a conventional trolling motor transom mounting clamp assembly 34 including upper and lower sleeve portions 36 and 38 through which the upper end portion 14 of the housing 12 is slidably and rotatably received. The sleeve portions 36 and 38 include internal replaceable sleeve inserts 40 and 42 to adapt the mounting clamp assembly to the particular diameter of the housing 12 and a stop collar 44 is also provided and mounted on the upper end portion 14 of the housing 12 and includes a set screw 48 whereby the elevational of the collar 44 on the upper end portion 14 may be adjusted and releasably retained as desired in order to adjust the height of the assembly 10 relative to the transom 50 of a boat 52 upon which the assembly 10 is mounted through the utilization of the mounting clamp assembly 34. The sleeve 36 includes a setscrew 54, but the setscrew 54 is utilized primarily as a friction brake whereby the housing 12 may not rotate totally freely relative to the sleeve portion 36. Of course, when the setscrew 48 is tightened on the upper end portion 14, the stop collar 44 lmits downward shifting of the upper end portion of the housing 12 relative to the mounting clamp assembly 34. It is believed obvious that the height of the stop collar 44 may be readily adjusted on the upper end portion 14 in order to adjust the elevation of the propeller 30 in relation to the bottom 56 of the boat 52.

Figure 5:
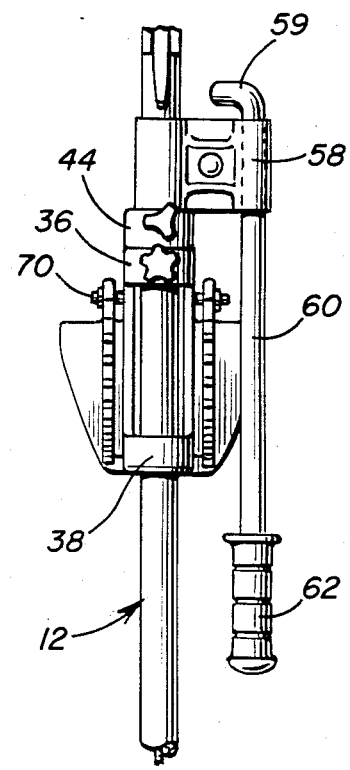
FIG. 5 is a fragmentary rear elevational view of the converted line trimmer illustrating the transom mounting portion thereof and the steering handle in a stored condition.
Figure 2:
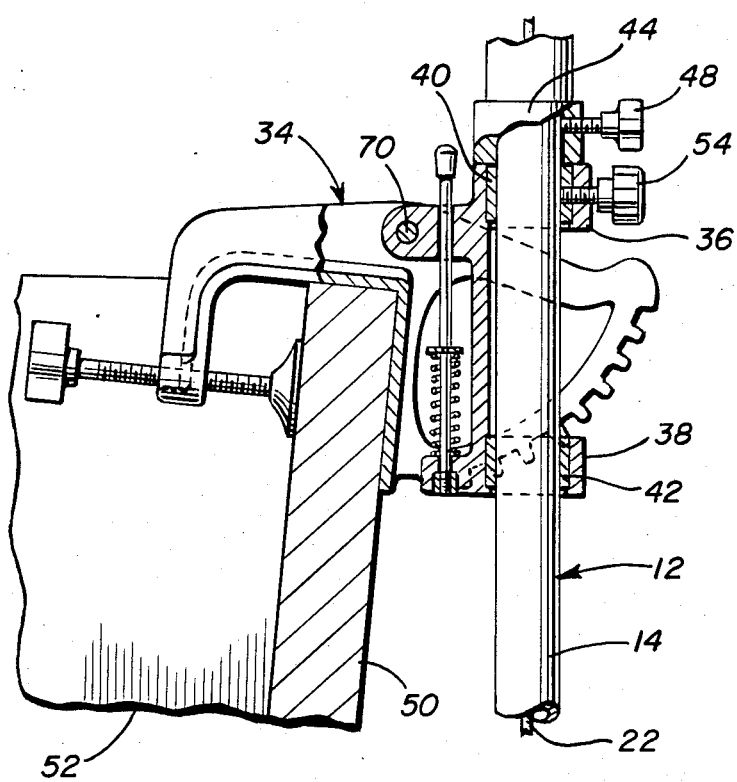
FIG. 2 is an enlarged fragmentary vertical sectional view illustrating the structure by which the converted line trimmer is mounted from the boat transom.

A clamp assembly 58 is provided and mounted upon the upper end portion 14 above the stop collar 44 and the clamp assembly 58 supports one angulated end portion 59 of a steering arm 60 therefrom having a handgrip 62 on its end remote from the angulated end portion 59. The steering arm 60, however, may be supported via the clamp assembly 58 in a retracted position for transport and storage with the support arm 60 closely paralleling the upper end portion 14, see FIG. 5.

The conventional line trimmer includes a throttle control assembly 64 operatably connected to the carburetor 66 of the engine or motor 20 by a flexible cable 68 and the throttle control assembly 64 is usually mounted on the end portion 14 of the housing 12 immediately beneath the engine or motor 20. However, when converting the line trimmer to an outboard trolling motor, the flexible cable 68 is replaced by a slightly longer flexible cable and the throttle control assembly 64 is mounted on the steering arm 60 closely adjacent the handgrip 62, see the phantom line position of the throttle control assembly 64 illustrated in FIG. 1.

Figure 1:
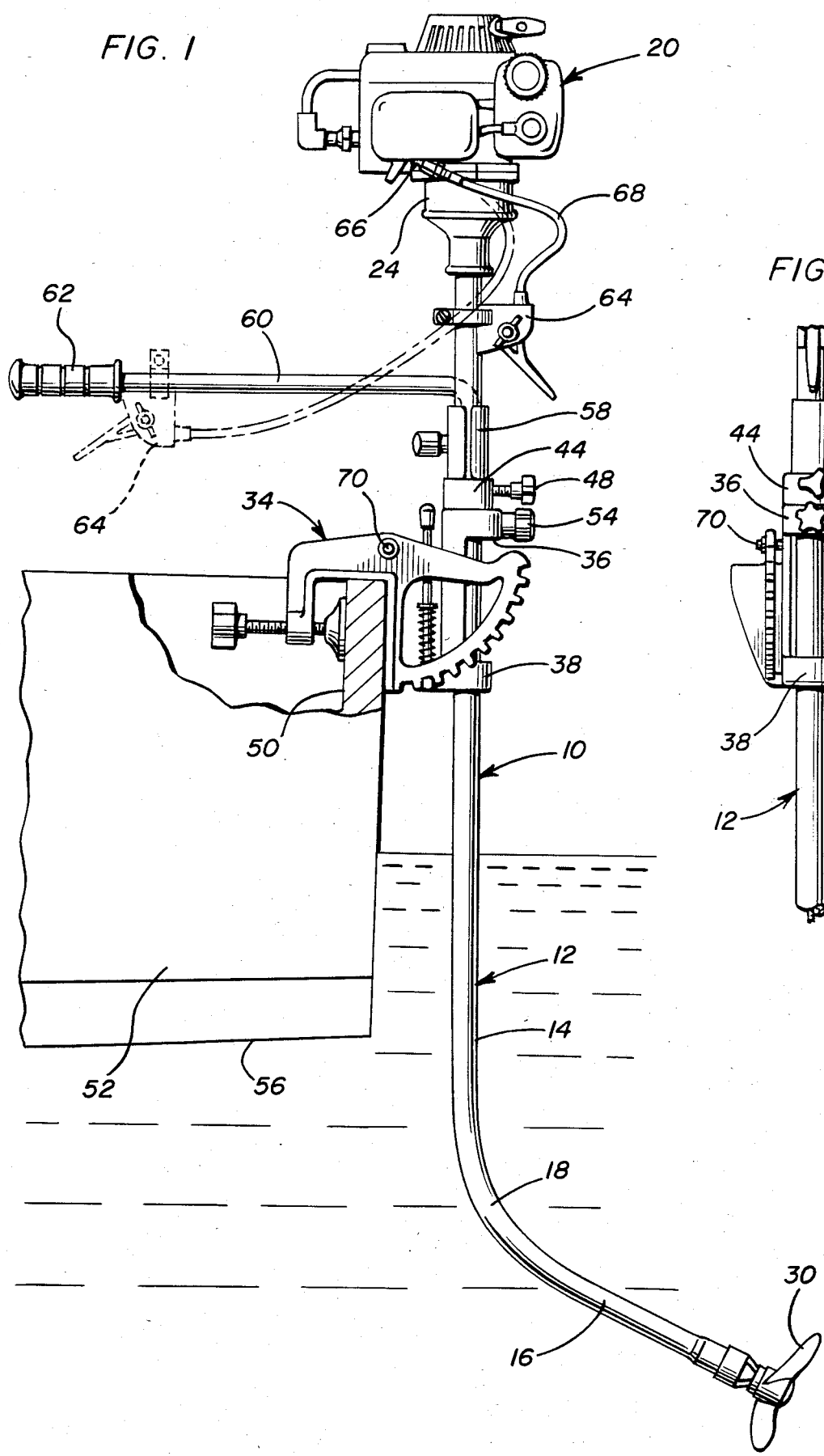
FIG. 1 is a fragmentary elevational view of the rear transom portion of a boat having a line trimmer converted to a trolling motor operatively mounted thereon.

After the line trimmer has been converted, as illustrated in FIG. 1 of the drawings and mounted upon the transom 50 of the boat 52, it is merely necessary to start the engine 20, to control the speed of operation of the engine 20 by the throttle control assembly 64 and to steer the converted assembly 10 by using support arm 60.

The mounting clamp assembly 34 is of conventional design and incldues structure by which the aligned sleeve portions 36 and 38 may be angularly adjusted about a pivot axis 70 in a conventional manner.

The conversion of the assembly 10 between a line trimmer and an outboard trolling motor may be carried out through the utilization of only simple hand tools and accomplished in a minimum amount of time. Further, the additional expense of the propeller 30, longer flexible throttle control cable, support arm 60, clamp assembly 58 and mounting clamp assembly 34 is minimal in comparison to the cost of an electric trolling motor. Further, an electric trolling motor battery and battery charger to recharge the battery comprise costs of owning and operating an electric trolling motor which are often initially overlooked. These costs are eliminated by the converted line trimmer 10, and only the cost of fuel is an added cost.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. The method of converting a line trimmer into an outboard trolling motor and wherein the trimmer includes and elongated tubular housing having relatively angulated opposite end portions joined by the smoothly curved intermediate length portion, and elongated flexible drive shaft extending through and journalled from said housing, a drive motor mounted on one end portion of said housing including rotary output shaft drivingly coupled to the corresponding end of said drive shaft, a handle mounted on said one end portion and spaced from said drive motor, and a trimmer line spool head removably threadingly mounted on the other end of said drive shaft remote from said motor, said method including the steps of unthreading said head from the last mentioned end of said drive shaft, threadingly mounting a marine screw-type propeller on said last mentioned end in lieu of said head, removing said handle from said one end portion, providing a boat supportable mount for said one end portion of said housing and rotatably mounting said housing one end portion from said mount, with said housing one end portion disposed in upstanding position, for angular displacement relative to said mount about an axis at least closely paralleling the center axis of said housing one end portion.

2. Th method of claim 1 including mounting one end of an elongated steering handle on said housing one end portion with said handle projecting outwardly from the side of said housing one end portion opposite the side thereof from which said other housing end portion projects.

3. The method of claim 1 wherein the step of rotatably mounting said housing one end portion from said mount for angular displacement relative thereto includes the step of mounting said housing one end portion from said mount for longitudinal shifting relative to said mount and providing adjustable means for limiting downward shifting of said housing one end portion relative to said mount.

4. The method of claim 2 wherein said trimmer includes a speed of operation control for said drive motor mounted on said one end portion of said housing and said method includes the relocation of said speed of operation control from said one end portion of said housing to the other end of said handle.

5. The method of claim 4 wherein the step of rotatably mounting said housing one end portion from said mount for angular displacement relative thereto includes the step of mounting said housing one end portion from said mount for longitudinal shifting relative to said mount and providing adjustable means for limiting downward shifting of said housing one end portion relative to said mount.

6. The method of claim 5 wherein the step of rotatably mounting said housing one end portion from said mount includes the step of mounting said housing one end portion from said mount for angular positioning of said one housing end portion relative to said mount about a horizontal axis transverse to said housing one end portion.

* * * * *